April 15, 1952  V. S. DANIELSON  2,592,661
FRICTION SHOCK ABSORBER FOR RAILWAY CAR TRUCKS
Filed Aug. 4, 1949

Inventor:
Vernon S. Danielson.
By Henry Fuchs.
Atty.

Patented Apr. 15, 1952

2,592,661

UNITED STATES PATENT OFFICE 2,592,661

FRICTION SHOCK ABSORBER FOR RAILWAY CAR TRUCKS

Vernon S. Danielson, Dolton, Ill., assignor to W. H. Miner, Inc., Chicago, Ill., a corporation of Delaware Application August 4, 1949, Serial No. 108,495

5 Claims. (Cl. 213—31)

This invention relates to improvements in friction shock absorbers especially adapted for use in connection with railway car trucks for snubbing or dampening the action of the truck springs.

One object of the invention is to provide a friction shock absorber including a friction casing, friction shoes slidingly telescoped within the casing in frictional contact with the interior walls thereof, and means yieldingly opposing movement of the shoes inwardly of the casing, wherein means is provided for breaking the contact between the friction surfaces of the shoes and friction surfaces of the casing, at or near the end of the compression stroke, to facilitate release of the mechanism.

A more specific object of the invention is to provide a mechanism as set forth in the preceding paragraph, wherein the shoes are wedged laterally inwardly toward each other, at or near the end of the compression stroke of the mechanism, to break the contact between the friction surfaces of the shoes and casing and facilitate release of the mechanism.

Other objects of the invention will more clearly appear from the description and claims hereinafter following.

Figure 1:
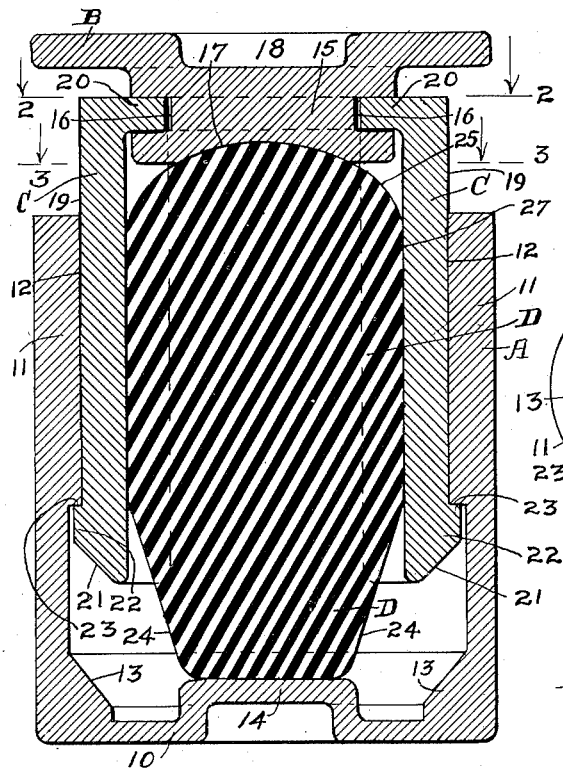
Figure 2:
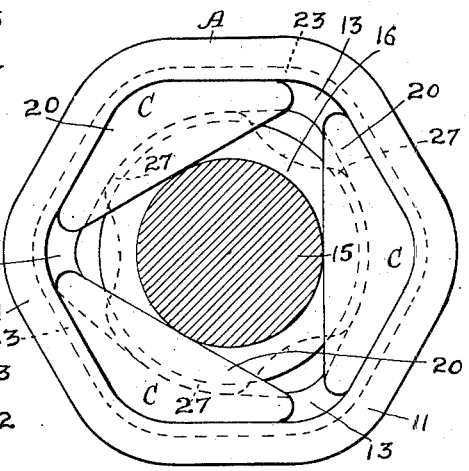
Figure 4:
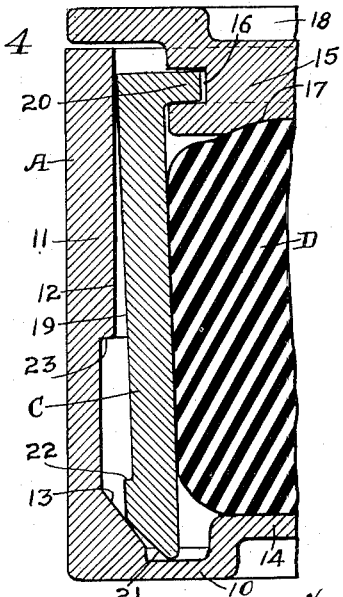
Figure 3:
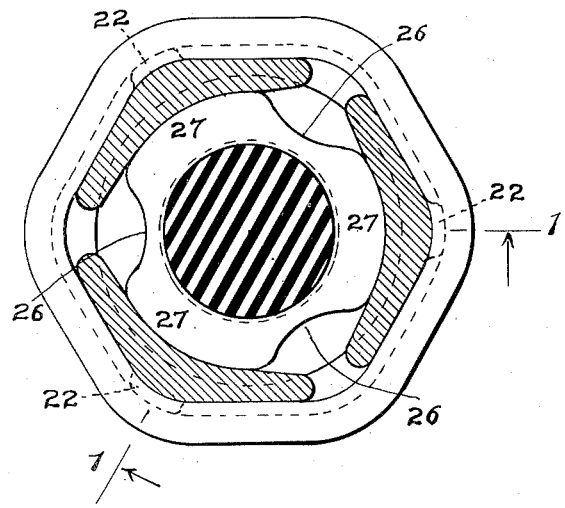

In the accompanying drawing forming a part of this specification, Figure 1 is a vertical sectional view of my improved shock absorber, taken on two intersecting planes 120 degrees apart, said view corresponding substantially to the line 1—1 of Figure 3. Figure 2 is a horizontal sectional view, corresponding substantially to the line 2—2 of Figure 1. Figure 3 is a horizontal sectional view, corresponding substantially to the line 3—3 of Figure 1. Figure 4 is a broken view, similar to Figure 1, showing the mechanism fully compressed.

As shown in the drawing, my improved shock absorber comprises broadly a friction casing A, a top follower B, three friction shoes C—C—C, and a rubber block D.

The friction casing A is in the form of a tubular member of substantially hexagonal, transverse cross section. The casing A is open at its upper end and has a transverse bottom wall 10 at its lower end. At the open upper end thereof, the walls of the casing are inwardly thickened to provide a friction shell section 11. The friction shell section 11 presents three longitudinally extending, interior friction surfaces 12—12—12 of V-shaped, transverse cross section, parallel to the central, longitudinal axis of the casing. At the bottom end of the casing, respectively in vertical alignment with the friction surfaces 12—12—12, are three interior wedge faces 13—13—13, also of V-shaped, transverse cross section. The bottom wall 10 of the casing is provided with an upstanding, central, hollow boss 14 in which the usual spring centering projection or lug of the lower spring plate of a cluster of truck springs is adapted to be engaged.

The top follower B is in the form of a relatively thick, hexagonal plate, having a depending, central, cylindrical projection 15, which is provided with a circumferential, laterally outwardly opening groove 16 between its top and bottom ends. The bottom face of the projection 15 is formed with a concavity, providing a downwardly facing, central concave seat 17, adapted to engage over the top end of the rubber block D. The platelike portion of the follower B has an upwardly opening, central seat 18 therein, adapted to accommodate the spring centering projection or lug of the top spring follower plate of a cluster of truck springs.

The shoes C—C—C are of similar design, each shoe being in the form of a heavy platelike member of V-shaped, transverse section, presenting a lengthwise extending friction surface 19 on its outer side, engaged with one of the friction surfaces 12 of the casing. At the upper end, each shoe has a laterally inwardly extending flange 20 engaged in the groove 16 of the follower B, thus connecting the same to the latter for movement in unison therewith. At the bottom end, each shoe C presents a wedge face 21, conforming to and engageable with the corresponding wedge face 13 of the casing A. The bottom end of each shoe is further provided with a laterally outwardly projecting stop or retaining lug 22, engageable in back of a horizontal shoulder 23, presented by the lower end of the inward enlargement forming the friction shell section 11 of the casing.

The rubber block D is in the form of an elongated solid member, having its bottom end downwardly tapered, as indicated at 24, and its upper end rounded, or convexly curved, as indicated at 25. The block D is recessed, or grooved lengthwise, as indicated at 26—26—26, at three circumferentially spaced points, thus providing wings 27—27—27, which project radially and bear on the inner sides of the shoes C—C—C, respectively. The recessed portions 26 of the block provide clearance for radial expansion of the block as the same is being compressed lengthwise.

The bottom end of the rubber block D bears on the upstanding boss 14 on the bottom wall 10 of the casing A, and the follower B is supported on the top end of the block with its concave seat 17 engaged over the convexly rounded end 25 of said block.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the follower B is forced downwardly with respect to the casing A, carrying the shoes C—C—C downwardly therewith and compressing the rubber block D in lengthwise direction against the bottom wall of the casing. Due to this lengthwise compression of the block D, the same is spread apart laterally, thereby pressing the shoes against the friction surfaces of the casing with progressively increasing force as the shoes are slid inwardly along the friction surfaces 12 of the casing. High frictional resistance is thus produced to snub or dampen the action of the truck springs. As full compression of the mechanism is approached, the wedge faces 21 at the bottom ends of the shoes engage the wedge faces 13 of the casing, thereby wedging the lower ends of the shoes laterally outwardly to tilt the same, as shown in Figure 4, and break the contact between the friction surfaces 19 of the shoes and the friction surfaces 12 of the casing. This action eliminates sticking of the shoes, thus greatly facilitating release of the mechanism.

Upon recoil of the truck springs, the actuating force on the follower B is reduced, permitting restoration of all of the parts of the mechanism to the full release position shown in Figure 1 by the longitudinal expansion of the rubber block D in returning to its normal shape, outward movement of the shoes being limited by engagement of the lugs 22 thereof with the shoulders 23 of the casing.

I claim:

1. In a friction shock absorber, the combination with a friction casing having interior friction surfaces; of friction shoes slidingly telescoped within the casing in sliding frictional contact with the friction surfaces thereof; yielding means within the casing, reacting between said shoes and casing for resisting inward movement of the shoes; and cooperating means on said shoes and casing operative toward the end of the compression stroke of the mechanism exerting inward pressure on the lower ends of said shoes for tilting the shoes with respect to the casing to break the frictional contact between said shoes and casing friction surfaces.

2. In a friction shock absorber, the combination with a friction casing having interior friction surfaces; of friction shoes slidingly telescoped within the casing in sliding frictional contact with the friction surfaces thereof; yielding means within said casing reacting between the latter and said shoes for resisting movement of said shoes inwardly of the casing and laterally toward each other; and cooperating wedge means on said shoes and casing operative toward the end of the compression stroke of the mechanism for wedging the inner ends of the shoes laterally inwardly to tilt the shoes with respect to the casing and break the frictional contact between said shoes and casing friction surfaces.

3. In a friction shock absorber, the combination with a friction casing having interior friction surfaces; of friction shoes slidingly telescoped within the casing in sliding frictional contact with the friction surfaces thereof; a rubber block interposed between said shoes and bearing at its opposite ends on said casing and shoes for yieldingly resisting movement of the shoes inwardly of the casing and laterally toward each other; and cooperating inclined faces on the inner ends of said shoes and the inner end of the casing engageable with each other toward the end of the compression stroke of the mechanism for wedging the shoes inwardly at their inner ends to tilt the shoes with respect to the casing and break the frictional contact between said shoes and casing friction surfaces.

4. In a friction shock absorber, the combination with a friction casing having interior friction surfaces; of friction shoes slidingly telescoped within the casing in sliding frictional engagement with the friction surfaces thereof; yielding means within the casing bearing on said shoes for resisting inward movement of the shoes; and cooperating wedge faces on the rear ends of said shoes and the rear end portion of the casing, engageable with each other after the mechanism has been compressed to a predetermined extent less than the full compression stroke, for wedging the lower ends of said shoes laterally inwardly to tilt said shoes with respect to the casing and break the frictional contact of said shoes with the friction surfaces of the casing.

5. In a friction shock absorber, the combination with a friction casing open at one end and closed at the other end and having interior friction surfaces at said open end, said casing having interior wedge faces at said closed end; of a follower movable toward and away from said casing; friction shoes movable in unison with said follower, slidingly telescoped within said casing and having friction surfaces on their outer sides engaged with the friction surfaces of the casing; wedge faces on the inner ends of the shoes engageable with the wedge faces of the casing toward the end of the compression stroke of the mechanism to tilt the shoes with respect to said casing; and a rubber block within the casing tightly embraced by said shoes and having its top and bottom ends buttressed, respectively, against the follower and the closed end of the casing.

VERNON S. DANIELSON.

REFERENCES CITED

The following references are of record in the file of this patent:

UNITED STATES PATENTS

| Number | Name | Date |
|---|---|---|
| 2,286,845 | Cottrell et al. | June 16, 1942 |
| 2,306,393 | Light | Dec. 29, 1942 |
| 2,331,620 | Nelson | Oct. 12, 1943 |
| 2,382,563 | Haseltine | Aug. 14, 1945 |
| 2,403,583 | Dath | July 9, 1946 |
| 2,413,812 | Dath | Jan. 7, 1947 |